United States Patent Office 3,080,281
Patented Mar. 5, 1963

3,080,281
HYDROXY-CONTAINING HEMI-ACETALS, THEIR PREPARATION AND USE
Rudolph F. Fischer, Oakland, and Curtis W. Smith, Berkeley, Calif., assignors to Shell Oil Company, New York, N.Y., a corporation of Delaware
No Drawing. Filed Jan. 22, 1960, Ser. No. 3,988
14 Claims. (Cl. 167—49.5)

This invention relates to a new class of acetals and to their preparation. More particularly, the invention relates to new hydroxy-containing hemi-acetals, to their preparation from formaldehyde and a dissimilar aldehyde, and to their utilization, particularly for the treatment of textiles.

Specifically, the invention provides new and particularly useful hydroxy-containing hemi-acetals which surprisingly react in many cases like aldehydes but do not possess the disadvantages of aldehydes, such as strong odor and high toxicity. The new products comprise organic compounds possessing at least one and preferably two or more hemi-acetal

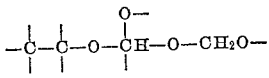

groups and at least one and preferably a plurality of alcoholic OH groups.

As a special embodiment, the invention provides new hydroxy-containing hemi-acetals of the formula

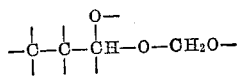

wherein R is an alkylene radical, $x$ is an integer of 1 to 5, $y$ is an integer of 1 to 5 and $n$ is an integer of at least 2, and preferably 2 or 3. At least one of the $R_1$'s is hydrogen and the others may be hydrogen or alkyl groups, or in some cases, two of the $-OR_1$'s may be removed and the remaining radicals joined together through an oxygen atom to form say a carbonyl group or a cyclic ring.

The invention further provides a process for preparing the above-described new hydroxy-containing hemi-acetals which comprises reacting formaldehyde with a dissimilar aldehyde, such as, for example, acrolein, in at least a 1:1 mol ratio in the presence of an OH-containing material and in an acidic medium.

It is an object of the invention to provide a new class of acetals. It is a further object to provide new hydroxy-containing hemi-acetals and a method for their preparation. It is a further object to provide new hydroxy-containing hemi-acetals which have properties which make them particularly useful and valuable in industry. It is a further object to provide new hydroxy-containing hemi-acetals which react in many cases like aldehydes, but are free of the deleterious effects of aldehydes such as strong odor and high toxicity. It is a further object to provide new hydroxy-containing hemi-acetals prepared from acrolein which possess the trifunctionality of acrolein but do not possess the disadvantages of acrolein, such as strong odor. It is a further object to provide new liquid non-volatile hemi-acetals that are particularly effective for treating fibrous material. It is a further object to provide new hydroxy-containing hemi-acetals that are particularly effective as wet strength agents for paper. It is a further object to provide new hydroxy-containing hemi-acetals that are useful for the preparation of non-woven fabrics. It is a further object to provide new hydroxy-containing hemi-acetals that are good cross-linking agents for hydroxy-containing materials as starch. It is a further object to provide new hemi-acetals that can be condensed with phenols to form new phenolic materials. It is a further object to provide new hydroxy-containing hemi-acetals that can be used to insolubilize casein and other albuminous materials. It is a further object to provide new liquid hemi-acetals from formaldehyde and acrolein which react with amines to form useful resinous materials. These and other objects of the invention will be apparent from the following detailed description thereof.

It has now been discovered that these and other objects of the invention can be accomplished by the new hydroxy-containing hemi-acetals which possess at least one and preferably two or more hemi-acetal

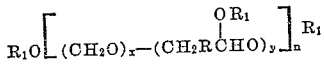

groups and at least one and preferably a plurality of alcoholic OH groups. It has been found that the above-described new hydroxy-containing hemi-acetals possess many valuable properties which make them particularly useful and valuable in industry. It has been found, for example, that these new materials surprisingly react like aldehydes in many cases but do not have the disadvantages of aldehydes, such as strong odor and high toxicity. The new materials have been found to be particularly outstanding for treating fibrous material as they impart improved properties thereto. Textile fabrics treated with the new materials have greatly improved crease resistance in both wet and dry state. Furthermore, this improvement is accomplished by the use of only very small amounts of the new hydroxy-containing hemi-acetals and without causing a loss of other desired properties, such as hand, strength and the like. Further advantage is also found in the fact that the treated fabric is non-chlorine retentive and can be subjected to bleaching and application of heat without discoloration.

The new hemi-acetals are also of particular value in the treatment of other fibrous materials, such as paper, leather and the like. They are particularly effective as wet strength agents for sulfite and Kraft paper and as tanning agents for cowhide, calfskin, goatskin and the like. They are also useful in the preparation of non-woven fabrics from synthetic and natural materials.

The hemi-acetals of the present invention are also useful as insolubilizing agents for starch, such as cereal, corn, rice, wheat, root, potato, tapioca and the like, starches and as insolubilizing agents for casein and other albuminous materials. They are also of value as cross-linking agents for hydroxy-containing materials, such as cellulose derivatives, cellulose ethers and esters as ethyl and methyl cellulose, cellulose acetate and propionate, and cross-linking agents for hydroxy-containing polymers as polyvinyl alcohol, hydrolyzed copolymers of vinyl acetate and alpha-olefins, polyalyl alcohols and the like.

The new hemi-acetals may also be used to produce resinous materials by reaction with polyhydric alcohols such as pentaerythritol, di- and polypentaerythritols, and then reacting the resulting product with polyisocyanates, such as, for example, toluene diisocyanate, durene diisocyanate, benzene diisocyanate and the like.

The new hemi-acetals also find use in the preparation of new phenolic derivatives by condensation with phenols. Such materials may be subsequently reacted with epichlorohydrin in the presence of caustic to form new epoxy resins.

The hemi-acetals of the present invention may be used for the treatment of wood, as tissue fixing agents as embalming fluids and agents for use in medical pathological work and as intermediates for the preparation of fungicides and insecticides and as intermediates for the preparation of oil-soluble derivatives for use in lubricating and fuel oil compositions.

The new hydroxy-containing hemi-acetals of the present invention comprise those organic compounds possessing at least one and preferably two or more hemi-acetal

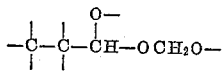

groups and at least one and preferably a plurality of alcoholic OH groups. The main chain containing the above-noted group or groups may be open-chain or cyclic and may contain substantially aliphatic or cycloaliphatic carbon atoms and or oxygen atoms. The length of the molecule will depend on the material selected.

The preferred hydroxy-containing hemi-acetals of the present invention include those of the formula

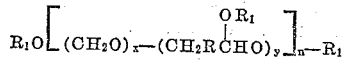

wherein R is an alkylene radical, $x$ is an integer of 1 to 5, $y$ is an integer of 1 to 5 and $n$ is an integer of at least 2, and preferably 2 or 3. At least one $R_1$ is hydrogen and the others are hydrogen or alkyl or in some cases two of the —$OR_1$'s may be removed and the remaining radicals joined together through an oxygen atom to form say a carbonyl group or a cyclic ring.

Examples of the new hemi-acetals include, among others:

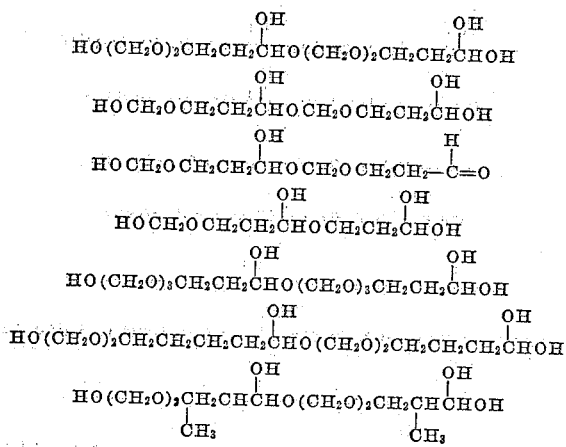

and cyclic hemi-acetals such as

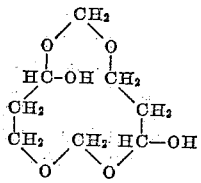

and

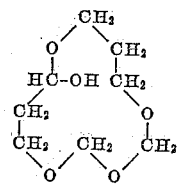

and

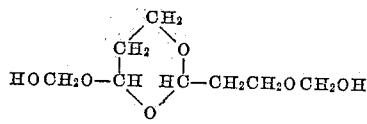

Especially preferred are those having the formula

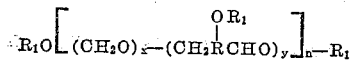

wherein $x$ is 1 to 3, $y$ is 1 to 3, $n$ is at least 2 and preferably 2 or 3, R is an alkylene group containing 1 to 3 carbon atoms, and $R_1$ is hydrogen or alkyl.

The new products of the invention are prepared by reacting formaldehyde with a dissimilar aldehyde under acidic conditions. Preferred aldehydes to be reacted with formaldehyde include the aliphatic polyaldehydes, such as glutaraldehyde, hydroxyadipaldehyde, succinaldehyde and the like, and those aldehydes having attached to or involving a carbon atom alpha or beta to the

group a functional as OH, —NHR (wherein R is an alkyl radical), —$NH_2$ or —SH or an aliphatic carbon-to-carbon unsaturated linkage. Examples of these include, among others, 2-hydroxypropionaldehyde, 3-hydroxypropionaldehyde, 2-hydroxybutyraldehyde, 3-hydroxybutyraldehyde, 3-mercaptopropionaldehyde, 3-aminopentanal, 2-mercaptohexanal, 2-aminododecanal, 3-hydroxycyclohexanal, acrolein, methacrolein, crotonaldehyde, alphaphenylacrolein, alpha-cyclohexylacrolein, 2-pentenal, 3-hexenal, 2-decenal, 2-cyclohexenal and 2-hydroxy-3-mercaptotetradecanal.

Preferred members of the above group of aldehydes include the alpha-hydroxy-substituted aliphatic and cycloaliphatic monoaldehydes, the alpha-amino substituted aliphatic and cycloaliphatic monoaldehydes, the alpha-mercapto substituted aliphatic and cycloaliphatic monoaldehydes, the alpha,beta-ethylenically unsaturated aliphatic and cycloaliphatic monoaldehydes, the beta-hydroxy-substituted aliphatic and cycloaliphatic monoaldehydes, the beta-amino substituted aliphatic and cycloaliphatic monoaldehydes, the alpha-mercapto substituted aliphatic and cycloaliphatic monoaldehydes, and the beta, gamma-ethylenically unsaturated aliphatic and cycloaliphatic monoaldehydes, the total number of carbon atoms in each case not exceeding 14. Also preferred are the above-noted substituted alkanals, cycloalkanals and alkenals and cycloalkenals containing up to 12 carbon atoms.

The preferred members may be exemplified by the following formulae

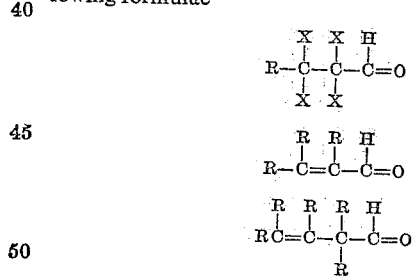

wherein at least one and preferably 1 to 2 X's is or are an OH, SH or $NH_2$ or alkyl substituted amino group, and the other X's not so occupied is (or are) an R. R is a member of the group consisting of hydrogen atom and hydrocarbon radicals, and preferably aliphatic and cycloaliphatic hydrocarbon radicals containing up to 12 carbon atoms.

Coming under special consideration are the ethylenically unsaturated aldehydes, particularly because of the outstanding properties of the resulting products in the treatment of textile fabrics. These include, among others, the alpha,beta-ethylenically unsaturated monoaldehydes and the beta-gamma-ethylenically unsaturated monoaldehydes, such as acrolein, methacrolein, crotonaldehyde, alpha-cyclohexylacrolein and the like.

Formaldehyde may be employed in any of its forms in making the new products. This includes, for example, formalin, para-formadlehyde, trioxane and methylal.

The amount of the dissimilar aldehyde and the formaldehyde to be employed will vary within certain limits. The dissimilar aldehyde and formaldehyde may, for example, be combined in mol ratios varying from say 8:1 to 1:8. Particularly outstanding results are obtained when the aldehyde and formaldehyde are combined in mol ratios varying from 4:1 to 1:4 and more preferably in mol ratios varying from 1:1 to 1:2.

The reaction between the above-described aldehyde reactants is accomplished in an acidic medium. It is preferred to have the reaction medium at a pH between .5 to 6, and still more preferably between .5 to 3. When expressed on a normality basis, it is preferred to use reaction media having a normality of .05 N to 1 N.

The acidic medium can be obtained by the addition of a variety of acidic or acid forming materials, such as, for example, sulfuric acid, oxalic acid, alkane sulfonic acids, phosphoric acid, amine phosphates, acid metallic halides, such as zinc chloride, magnesium chloride, stannic chloride, aluminum chloride, zinc nitrate, acid clays, etc. The concentration of the acids employed and amount added will depend on the particular ingredient selected and the acidity desired. It is generally preferred to utilize moderately strong acids, such as sulfuric acid in concentrations ranging from about 20% to 98% by weight.

When the product is to be used for cloth treatment, it is sometimes preferred to use the acid acting salts such as magnesium chloride and zinc nitrate as the catalyst. In this case the material can be retained in the material and used as a catalyst for the subsequent reaction with the cloth.

The reaction is conducted in the presence of liquid medium containing OH groups such as water and aliphatic, cycloaliphatic and heterocyclic alcohols. The use of water is particularly desirable as the reaction product may then be used directly in the reaction medium for the treatment of textiles as noted hereinafter. If desired other diluents, such as ethanol, isobutanol, tetrahydrofuran, and the like and mixtures thereof may also be employed.

Temperatures employed may vary over a wide range. As the reaction is exothermic cooling should generally be employed to keep the temperature within the desired range. Preferred temperatures range from about 0° C. to 80° C., and more preferably temperatures range from 10° C. to 50° C. Superatmospheric, atmospheric or subatmospheric pressures may be used as desired.

Depending on method of preparation, the products may be used as such or may be subjected to further processing. If the products have been prepared in a suitable medium, such as water, and with catalysts, such as magnesium chloride or zinc nitrate, the product may be used directly in applications, such as cloth treating, leather treating and paper treating. If strong acids have been used that may be detrimental or not satisfactory for further applications, the reaction medium may be neutralized with basic materials before further utilization.

Further processing steps may also be employed to favor the production of the cyclic materials over the linear products. Thus, by use of ether extraction followed by azeotropic removal of the water with benzene until substantially all water has been removed, it is possible to greatly increase the formation of the cyclic hemi-acetal structures as shown above.

Products prepared by the above-noted techniques also may possess small amounts of other materials which for most applications will not be harmful and in many cases add to the effectiveness of the utilization. Thus, there may be small amounts of materials having a structure similar to those shown above wherein $x$ is 0 or $n$ is 1. For example, when $x$ is 0, compounds coming under the above-described formula may have the structure

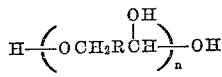

and when $n$ is 1, they will have the structure

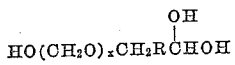

The compounds may also have a cycle structure such as

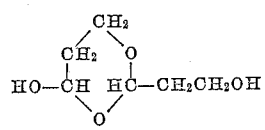

and

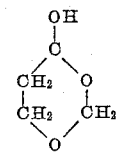

If not desired, these compounds may be removed by suitable means, such as extraction, distillation and the like. For cloth treatment, there is no need to remove such materials as their presence gives advantages.

The new hydroxy-terminated hemi-acetals produced by the above process will generally be substantially colorless fluid liquids. Their molecular weights will vary from about 150 to 250. The products are non-acid and non-alkali stable and decompose on application of heat. Because of these characteristics, it is preferred to maintain the material in solution as formed. As noted above, small amounts of other types of acetals, and particularly those of lower molecular weight, will generally be formed along with the desired hydroxy-terminated hemi-acetals. It has been found for most applications, and particularly for the use in treatment of fibrous materials, that these additional impurities have no effect on the utility of the new products.

The new products may be used for a variety of important applications. As noted, they may be used in the preparation of aqueous surface coating compositions or impregnating compositions or may be cross-linked to form castings and pottings and the like.

The products are particularly useful, however, for the treatment of fibrous materials, such as textile fabrics, yarns, threads, cords, paper, leather and the like to improve many of their desired properties or in glazing or embossing operations. In these applications, the products may be used in the unextracted form (as shown in the working examples) or in the extracted form. They are preferably employed in an aqueous medium and in combination with acidic curing agents. However, other media such as solvents or mixtures of water and solvents may be used as well as other types of curing agents. Suitable solvents include, among others, ethyl alcohol, butyl alcohol, isopropyl alcohol, acetone, dioxane, diacetone alcohol, esters, ethers, and ether esters of glycol and glycerol, ethylene dichloride, benzene, toluene and the like and mixtures thereof.

In some cases, it may be desirable to employ the new products in an aqueous emulsion or suspension. Suitable emulsifying agents include the ionic and non-ionic agents, such as, for example, monooleate of sorbitan polyoxyethylene, the trioleate of sorbitan polyoxyethylene, sorbitan tristerate, sorbitan monolaurate, polyoxyethylene ethers of alkylphenols, carboxymethylcellulose, starch, gum arabic, aryl and alkylated aryl sulfonates, such as cetyl sulfonate, oleyl sulfonate, sulfonated mineral oils, and the like, and mixtures thereof. The emulsifying agents are generally employed in amounts varying from 0.1% to 10% by weight and more preferably from 1% to 5% by weight.

The amount of the product employed in the aqueous medium for treatment of the fibrous materials may vary over a considerable range depending chiefly on the amount of product to be deposited on the fibrous material and this in turn will depend on the number of applications and the pick-up allowed per application. When the solution is applied but once, with a 90% to 100% pick-up by weight of the fabric in the dry state, a concentration ranging from about .5% to 25% by weight will ordinarily suffice. Preferred concentrations range from about 1.5% to 4%, and particularly 2%. If less than 80% pick-up is permitted, the concentration may, in some cases, go as high as 30% to 50%.

The curing agent employed may be any acidic catalytic material, such as organic and inorganic acids, such as, for example, oxalic acid, lactic acid, succinic acid, acetic acid, maleic acid, phosphoric acid, boric acid, sulfonic acid, perchloric acid, persulfuric acid, p-toluenesulfonic acid, sulfuric acid, and metal salts, such as zinc fluoborate, copper fluoroborate, zinc persulfate, cupric arsenite, cupric chlorate, cupric chromate, cupric dichromate, cupric fluosilicate, cupric nitrate, zinc nitrate, cupric sulfate, cobaltic chlorostannate, cobaltous fluoborate, cobaltous fluosilicate, cobaltous sulfite, chromic sulfate, chromic nitrate, lead borate, lead chlorate, lead phosphate, barium chlorate, barium phosphate, magnesium fluosilicate, magnesium dichloride, magnesium perchlorate, magnesium nitrate, magnesium fluoborate, magnesium sulfate, manganese sulfate, manganese fluoborate, cadmium arsenate, cadmium borate, cadmium perchlorate, cadmium phosphate, aluminum arsenate, aluminum chlorate, aluminum nitrate, aluminum fluoborate, nickel phosphate, nickel selenate, nickel sulfate, silver sulfate, silver nitrate, silver thiosulfate, stannic fluoborate, strontium chlorate, titanium sulfate, vanadium sulfate, zinc chlorate, zinc fluosilicate, zinc permanganate, zinc phosphate, zinc sulfate, zirconium sulfate, aluminum phosphate, aluminum sulfate, vanadium nitrate, vanadium sulfate, vanadium fluoborate, vanadium selenate, bismuth phosphate, ferric phosphate, ferric pyrophosphate, ferric sulfate, ferrous sulfite, ferrous perchlorate, mercuric arsenate, mercuric chromate, mercuric sulfate, mercurous chlorate, mercurous fluoborate, nickel fluoborate, nickel arsenate and the like, and mixtures thereof.

Particularly preferred curing agents are the organic and inorganic of the group consisting of organic mono- and dicarboxylic acids containing up to 10 carbon atoms, inorganic acids containing at least one element of the group consisting of halogen atoms, oxygen, sulfur, nitrogen and phosphorous, and metal salts of metals having an atomic weight between 10 and 240, and acids of the formula $$Ha[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valency of the radical $(X)_w(Z)_y$.

The amount of the curing agent to be utilized will vary over a wide range depending upon the condensation product selected, the method of cure, etc. Generally, amount used will vary from about .1% to 15% based on the weight of the condensation product. The metal salts and BF₃ complexes are preferably employed in amounts varying from about .1% to 8% and the organic acids and inorganic acids are preferably employed in amounts varying from .1% to 10% by weight of the condensation product.

The solution employed to treat the fibrous material may also contain plasticizers to improve their flexibility, though these should not be present in such proportions as to render the finished materials soft or sticky at temperature and humidities to which they would be exposed. It is found, however, that the substances employed in the present invention yield products which are sufficiently flexible for most purposes without the use of plasticizers. Among plasticizers that may be used according to the present invention may be mentioned organic and inorganic derivatives of phenols, for example, diphenylol propane and triphenyl and tricresyl phosphates, sulphonamides, sulphonarylides, alkyl phthalates, for example diethyl phthalate and glycol phthalates, diethyl tartarate, derivatives of polyhydric alcohols, for example, mono-, di- and triacetin, and products obtained by condensing polyhydric alcohols with themselves or with aldehydes or ketones. The compositions may also contain natural resins, e.g., shellac, rosin, and other natural resins and synthetic or semi-synthetic resins, e.g., ester gum, polyhydroxy-polybasic alkyd resins, phenolaldehyde and urea-aldehyde resins.

The new products may also be used in combination with polyepoxides, such as, for example, glycidyl ethers of polyhydric alcohols or phenols.

Textile softening agents, and particularly those of the cationic-type as stearamidoethyl diethyl methyl quaternary ammonium methyl sulphate, trimethyl ammonium methyl sulphate of monostearylmetaphenylenediamine, s-di 1-(2-palmitamidoethyl) urea monoacetate, palmityl amine hydrochloride, and the like, and mixtures thereof, may also be added in varying amounts to improve the feel of the treated fabrics. Other examples of suitable materials include polyethylenes, acrylics, silicones and the like.

The application of the solution containing the product to the fibrous material may be effected in any suitable manner, the method selected depending upon the results desired. If it is desired to apply the solution only to one surface of the material, as, for example, when it is desired to treat the back only of a fabric having a face of artificial or natural silk and a cotton back, the application may be effected by spraying as a liquid or gas or by means of rollers, or the composition may be spread upon the surface by means of a doctor blade. When, however, it is desired to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

The amount of the product to be deposited on the fibrous material varies over a wide range depending upon the property or properties to be imparted and the use of the finished material. If treated material is a fabric that is to have a soft feel, such as that intended for use for dresses, shirts, etc., the amount of condensation product deposited will generally vary from 1% to 20% by weight of the fabric. If stiffer materials are required such as for shoe fabrics, draperies, etc. still higher amounts of resins, such as of the order of 25% to 50% by weight may be deposited. If the material is paper and the property to be imparted is wet strength, the amount of material deposited may vary from about .1% to 15% by weight. In determining the amount of condensation product deposited, it should, of course, be remembered that the presence of the condensation product in a few instances causes a slight decrease in tear strength of the material and the amount deposited should be balanced between the desired properties and the desired tear strength.

If the desired amount of the product deposited is not obtained in one application, the solution can be applied again or as many times as desired in order to bring the amount of the condensation product up to the desired level.

After the desired amount of solution has been applied, the treated material is preferably dried for a short period to remove some or all of the dispersing liquid, such as water, alcohol, and the like. This is generally accomplished by exposing the wet material to hot gas at temperatures ranging from 50° C. to 80° C. The period of drying will depend largely on the amount of pick-up permitted during the application of the solution, and the concentration of the condensation product. In most instances, drying periods of from 5 to 30 minutes should be sufficient.

The dried material is then exposed to relatively high temperatures to accelerate the cure. Temperatures used for this purpose generally range from 100° C. to 200° C., and more preferably from 100° C. to 150° C. At these preferred temperature ranges the cure can generally be accomplished in from 3 to 10 minutes. Exposures of less than 3 minutes, e.g., 1 minute, may probably be used in continuous, commercial processing.

After curing, it is desirable in most cases to wash the treated material to remove any soluble materials. A perborate wash is particularly desirable.

The above-described process may be utilized for the treatment of any fibrous material. This includes textile material, such as woven fabrics, non-woven fabrics, threads, yarn, cord, and string, paper, leather, films and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wool, hair, and the like as well as synthetic materials which includes, among others, those prepared from acrylonitrile (Orlon—100% acrylonitrile polymer), vinylidene cyanide polymers, polyamides (nylon—super polyamide), polyester-polyamides, cellulose esters and ethers, and polymers prepared from corn protein and formaldehyde (Zein). As in the above-noted addition polymers, this includes the homopolymers as well as copolymers and terpolymers, such as, for example, Acrilan (85% acrylonitrile and 15% vinyl acetate), Dynel (60% vinyl chloride and 40% acrylonitrile) and Saran (85% vinylidene chloride and 15% vinyl chloride). Other synthetic fibers include those prepared from polyethylenes and polypropylenes, poylurethanes (Perluran), mineral fibers (Fiberglas) and Alginic materials as Alginate rayon.

The papers employed in the process of the invention include those prepared from wood, cotton, linen, hemp, jute, mulberry, straw, bamboo, cane fibers or mixtures thereof, by any of the known processes such as the sulfate process, soda process and sulfite process.

The leather employed is preferably cowhide, calfskin or other hides commonly employed in the preparation of leather goods.

The fibrous materials treated may be colorless or may be dyed, printed or otherwise colored to the desired shade. It is also possible to first subject the colorless material to the process of the invention and then apply the desired dye, pigment or other coloring material.

The materials treated according to the above-described process have many improved properties. As noted, the textile materials have improved resistance to creasing and shrinking as well as better resistance to pilling, fraying and snagging and improved dyeability. The paper has better wet strength and tear resistance as well as better abrasion resistance and improved fold endurance. The leather has improved resistance to loss of tanning properties.

The product treated as noted above may be utilized for any of the conventional applications, such as in the manufacture of dresses, drapes, upholsteries, shoe fabrics, carpets, coats, shirts, uniforms, shoes, towels, cords, construction paper, wrapping paper, containers and the like. The use will, in many cases, determine the amount of condensation product to be applied. Thus, less product will be utilized when the material is to be used for making soft goods, such as dresses, shirts and the like than where crispness and fullness is desired, such as in making rug, drapes, shoe fabrics and the like.

To illustrate the manner in which the invention may be carried out, the following examples are given. It is to be understood, however, that the examples are for the purpose of illustration and the invention is not to be regarded as limited to any of the specific materials or conditions recited therein.

The wrinkle recovery values reported in the examples were determined by the Monsanto Wrinkle Recovery Method (reported as sum of average warp and fill measures), and the tear strength values were determined by the Trapezoid Method ASTM D-39-49. All tests were carried out at 50% relative humidity and 78° F.

*Example I*

To a solution of 1 mol of formaldehyde in 11 parts of 50% sulfuric acid was added 1 mol of freshly distilled acrolein. The mixture had a normality of about 0.76. The temperature was allowed to rise to about 35–40° C. The mixture was cooled and held at room temperature for about 12 hours. The mixture was then neutralized with sodium hydroxide and then filtered. Analysis of the resulting product by infrared, molecular weight, functionality and carbon and hydrogen analysis indicates the solution contains a hydroxy-containing hemi-acetals of the formulae

and

Small amounts of each of the following were also present:

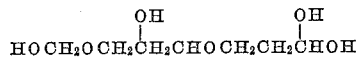

and

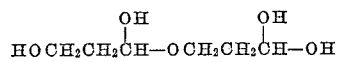

The above solution was combined with water to form a solution having 2% solids. 3% of 50% magnesium dichloride aqueous solution was added, and the combined mixture used to pad cotton fabric as in the preceding example. The impregnated sheet was then dried at 250° F. for 5 minutes and cured at 300° F. for 5 minutes. The finished product was washed with sodium perborate and rinsed three times in warm water and framed to dimensions and dried at 250° F. The material had a dry crease recovery of 250 (W+F) and had 76% retention of original strength. The scorch test gave a value of 79% reflectance (81% before test) as compared to 80% (82% before test) for the control.

Above padding process is repeated using solution having 4, 5, 6, 8, 9 and 10% solids. Related results are obtained.

*Example II*

To a solution of 1 mol of formaldehyde (formalin) in 11 parts of 50% sulfuric acid was added 1 mol of freshly distilled acrolein. The mixture had a normality of about 0.76. The temperature of the mixture was not allowed to rise above 35° C. The mixture was held at the lower temperature for several hours. A saturated solution of sodium sulfate was then added to neutralize the acid and the mixture extracted with ether. The ether was removed under vacuum followed by azeotropic distillation with benzene. The resulting product was a clear fluid liquid. Analysis by infrared, molecular weight, functionality and carbon and hydrogen analysis indicates the liquid contained a mixture of a hydroxy-terminated hemi-acetal of the formula

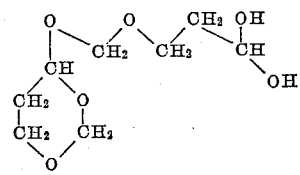

and

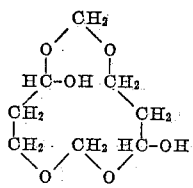

5 parts of the liquid hydroxy-terminated hemi-acetal prepared as above was combined with water to form a 5% solution and 10 parts of a 10% aqueous solution of zinc nitrate added as catalyst. Bleached cotton cloth was padded with the above solution by means of a Butterworth 3 roll laboratory padder. The cloth after padding showed an 80% wet pick-up. The impregnated cloth was then dried at 250° F. for 5 minutes and cured at 300° F. for 5 minutes. The finished product was then washed with sodium perborate solution, rinsed three times in warm water and then framed to dimensions and dried at 250° F. The cloth treated in this manner had the same appearance, feel and hand as before the treatment and had excellent shrink resistance and wet and dry crease resistance and excellent scorch resistance. The material had a dry MCRA value (W and F) of 243 compared to a value of 162 for the control (untreated). By AATCC Scorch Test the cloth had a percent reflectance of 79% (81% before test) compared to a value of 80% (82% before test) of untreated cloth. The excellent resistance to laundering is shown by the fact that the fabric treated in the above-described manner could be washed 20 or more times without material change in the high crease recovery values.

*Example III*

To a solution of 4 mols of formaldehyde (300 ml.) (Formalin) in 22 parts of 50% sulfuric acid was added 1 mol of freshly distilled acrolein. The mixture had a normality of 0.78. The temperature of the mixture was kept below 35° C. for 24 hours. The solution was then saturated with sodium sulfate and the mixture extracted with ether. The ether was removed under vacuum to give a clear fluid liquid. Analysis by infrared, molecular weight, functionality and carbon and hydrogen analysis indicate the liquid contained predominate amount of the hydroxy-terminated hemi-acetal of the formula

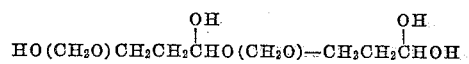

Smaller amounts of each of the following were also present:

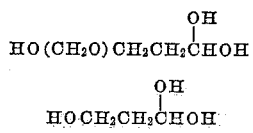

*Example IV*

This example illustrates the preparation of a hydroxy-terminated hemi-acetal from glyceraldehyde and formaldehyde using sulfuric acid as a catalyst.

To a solution of 1 mol of formaldehyde (Formalin) in 20 parts of 50% sulfuric acid was added 150 ml. anhydrous solution containing 1 mol of glyceraldehyde. The mixture had a normality of about 0.8. The temperature of the mixture was kept below 35° C. for 36 hours. A saturated solution of sodium sulfate was then added to neutralize the acid and the mixture extracted with ether. The ether was removed under vacuum to give a clear fluid liquid hydroxy-terminated hemi-acetal.

The above product was applied to cloth as shown in Example I. The resulting product had improved crease resistance.

*Example V*

This example illustrates the preparation of a hydroxy-terminated hemi-acetal from hydrolyzed dihydropyran and formaldehyde using sulfuric acid as the catalyst.

To a solution of 1 mol of formaldehyde (formalin) in 20 parts of 50% sulfuric acid was added 100 ml. of solution containing 1 mol of hydrolyzed dihydropyran. The mixture had a normality of about 1.0. The temperature of the mixture was kept below 35° C. for 29 hours. The solution was then saturated with Na$_2$SO$_4$ and the mixture extracted with ether. The ether was removed under vacuum to give a clear fluid liquid hydroxy-terminated hemi-acetal.

The above product was applied to cloth as shown in Example I. The resulting product had improved crease and shrink resistance.

*Example VI*

This example illustrates the preparation of a hydroxy-terminated hemi-acetal from glutaraldehyde and formaldehyde using sulfuric acid as the catalyst.

To a solution of 1 mol of formaldehyde (formalin) in 20 parts of 50% sulfuric acid was added 1 mol of 25% aqueous glutaraldehyde. The mixture had a normality of 0.4. The temperature of the mixture was kept below 35° C. for 48 hours. A saturated solution of sodium sulfate was then added to neutralize the acid and the mixture extracted with ether. The ether was removed under vacuum to give a clear fluid liquid hydroxy-terminated hemi-acetal.

The above product was applied to cloth as shown in Example I. The resulting product had improved crease resistance.

*Example VII*

Example I was repeated with the exception that hydroxy-acrylaldehyde was employed in place of acrolein. Related product and results on cloth are obtained.

*Example VIII*

Examples I to VI are repeated with the exception that the sulfuric acid is replaced by each of the following: phosphoric acid, nitric acid and amino hydrogen phosphate. Related results are obtained.

We claim as our invention:

1. A hemi-acetal of the structure

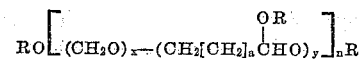

wherein at least one R is hydrogen and the other R's are members of the group consisting of hydrogen and alkyl radicals, $x$ is an integer of 1 to 5, $a$ is an integer of 1 to 8, $y$ is an integer of 1 to 5, $n$ is an integer of 2 to 5.

2. A solution consisting essentially of water and a hemi-acetal of the structure

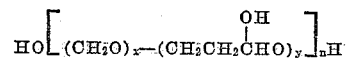

wherein $x$ is an integer of 1 to 3, $y$ is an integer of 1 to 3 and $n$ is an integer of 2 to 5.

3. A hemi-acetal of the structure

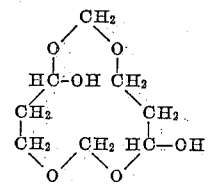

4. A solution consisting essentially of water and a compound having the structure

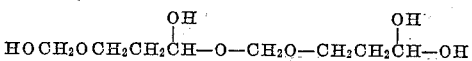

5. A solution consisting essentially of water and a mixture of water-soluble hemi-acetals of the formula

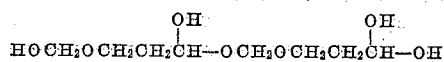

and

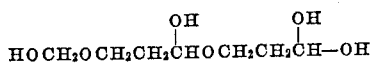

and

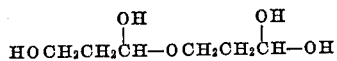

6. A solution consisting essentially of water and a mixture of water-soluble hemi-acetals of the formula

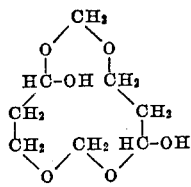

and

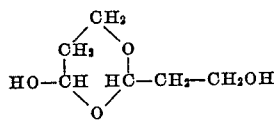

7. A process for preparing hydroxy-containing hemi-acetals which comprises reacting in the presence of water under acidic conditions, (1) formaldehyde, with (2) a dissimilar aldehyde.

8. A process as in claim 7 wherein the dissimilar aldehyde is a member of the group consisting of glutaraldehyde, hydroxyadipaldehyde, succinaldehyde, and aldehydes having attached to a member of the group consisting of alpha and beta carbon atoms relative to the

group, a member of the group consisting of —OH group, —NHR group wherein R is an alkyl group, —NH₂, and —SH group, and an ethylenic carbon-to-carbon unsaturated linkage.

9. A process as in claim 7 wherein the dissimilar aldehyde is acrolein and the acrolein and formaldehyde are combined in a mol ratio varying from 4:1 to 1:4.

10. A process as in claim 7 wherein the dissimilar aldehyde is acrolein and the acrolein and formaldehyde are combined in a mol ratio varying from 1:1 to 1:2.

11. A process as in claim 7 wherein the dissimilar aldehyde is a hydroxymonoaldehyde.

12. A process as in claim 7 wherein the temperature varies from 10° C. to 70° C.

13. A process as in claim 7 wherein the reaction medium has a pH between 3 and 6.

14. A process as in claim 7 wherein the aldehyde defined in (2) is acrolein, the acrolein and formaldehyde are combined in a mol ratio of 1:2, and the reaction is conducted in the presence of a sulfuric acid.

References Cited in the file of this patent

UNITED STATES PATENTS 2,078,534    Groll et al. _____ Apr. 27, 1937